(12) United States Patent
Iwamoto et al.

(10) Patent No.: US 7,384,252 B2
(45) Date of Patent: Jun. 10, 2008

(54) METHOD FOR PRODUCING TIRE VULCANIZING MOLD AND TIRE VULCANIZING MOLD

(75) Inventors: Gyoei Iwamoto, Tokyo (JP); Takehiro Kata, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/533,527

(22) PCT Filed: Oct. 31, 2003

(86) PCT No.: PCT/JP03/14005

§ 371 (c)(1),
(2), (4) Date: Feb. 17, 2006

(87) PCT Pub. No.: WO2004/048062

PCT Pub. Date: Oct. 6, 2004

(65) Prior Publication Data
US 2006/0257511 A1   Nov. 16, 2006

(30) Foreign Application Priority Data
Nov. 1, 2002   (JP) ............................. 2002-319957

(51) Int. Cl.
*B29C 33/10* (2006.01)
(52) U.S. Cl. ............................. 425/28.1; 419/2; 419/5; 419/27; 425/46; 425/812
(58) Field of Classification Search ................ 425/28.1, 425/46, 812; 419/2, 5, 27
See application file for complete search history.

(56) References Cited

U.S. PATENT DOCUMENTS

| 3,623,630 | A | * | 11/1971 | Rode | .......................... 419/27 |
|---|---|---|---|---|---|
| 3,706,550 | A | * | 12/1972 | Umehara et al. | ............. 419/18 |
| 3,804,566 | A | * | 4/1974 | Kumura et al. | ............ 425/28.1 |
| 4,314,399 | A | * | 2/1982 | Severinsson | .................... 419/5 |
| 6,147,138 | A | | 11/2000 | Hochsmann et al. | |
| 6,399,018 | B1 | * | 6/2002 | German et al. | ................. 419/2 |
| 6,592,807 | B2 | * | 7/2003 | Tuttle et al. | .................... 419/2 |
| 2001/0048182 | A1 | * | 12/2001 | Caretta et al. | ................. 425/46 |

FOREIGN PATENT DOCUMENTS

| DE | 1800081 | * | 10/1969 |
|---|---|---|---|
| EP | 868955 A1 | | 10/1998 |
| EP | 1010510 A2 | | 6/2000 |

(Continued)

*Primary Examiner*—James Mackey
(74) *Attorney, Agent, or Firm*—Sughrue Mion, PLLC (57) ABSTRACT

A 3-D solid model of a tire vulcanizing mold is constructed on CAD, lamination models the optimum value of the pitch of which is determined in consideration of molding accuracy and processing time are created by dividing this model in a predetermined lamination direction, slice data for each layer corresponding to the lamination pitch of each segment are created, a sector mold of the tire vulcanizing mold is manufactured by a powder sintering method based on the slice data, and the density of a sintered body is controlled by adjusting the output of a laser beam or the exposure time of the laser beam applied to the powders to provide a density distribution on the plane and in the depth direction of a mold element for each layer so as to obtain a tire vulcanizing mold having a hybrid structure.

23 Claims, 9 Drawing Sheets

| | FOREIGN PATENT DOCUMENTS | | | WO | WO 88/01927 | * | 3/1988 |
|---|---|---|---|---|---|---|---|
| JP | 59-212210 | * | 12/1984 | WO | 97/19776 A1 | | 6/1997 |
| JP | 2000-234103 A | | 8/2000 | | | | |
| JP | 2001-152204 A | | 6/2001 | * cited by examiner | | | |

METHOD FOR PRODUCING TIRE VULCANIZING MOLD AND TIRE VULCANIZING MOLD

BACKGROUND OF THE INVENTION

1. Field of the Invention

The present invention relates to a tire vulcanizing mold for vulcanizing and molding a tire and a process for manufacturing the same.

2. Description of the Prior Art

To form a tire, a vulcanizing mold is used in which pressure is applied to the inside of the molded green tire to pressure contact the outer surface of the above green tire to the inner wall of the heated mold in order to vulcanize the crude rubber by heat and pressure.

Figure 11A:
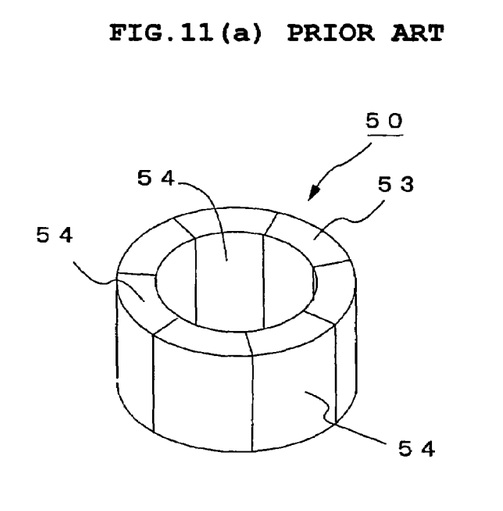
FIGS. 11(a) and 11(b) are diagrams showing an example of a split type mold of the prior art.
Figure 11B:
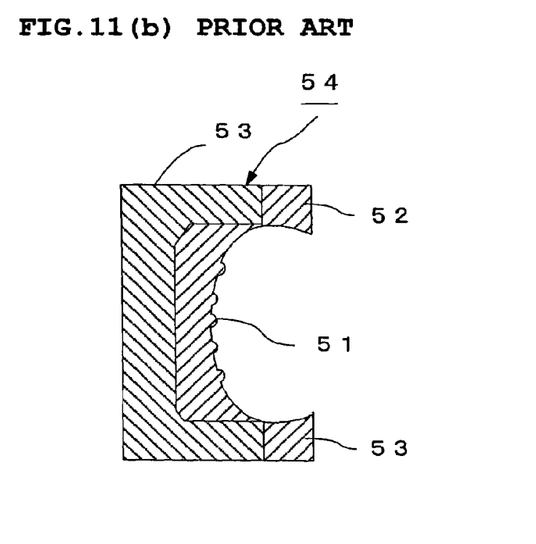
Figure 12A:
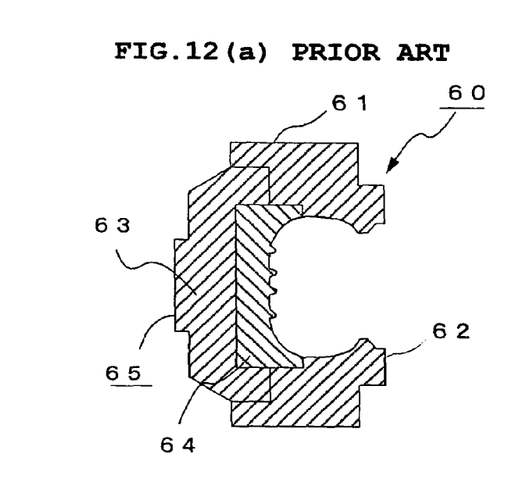
FIGS. 12(a) and 12(b) are diagrams showing an example of a piece type tire mold of the prior art.
Figure 12B:
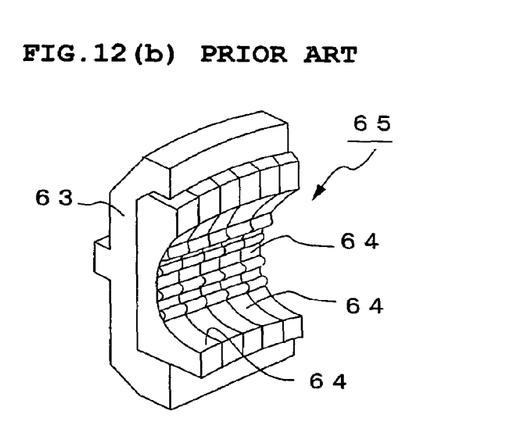

The above vulcanizing mold is a full type mold which is cast for a whole tire integrally or a split type mold 50 consisting of a plurality of sector molds 54, each comprising a crown mold 51 having a sectional form corresponding to a tire crown portion and side molds 52 mounted to a holder 53, all of which are interconnected in a loop as shown in FIGS. 11(a) and 11(b). A piece type tire mold 60 consisting of a plurality of sector molds 65, each comprising upper and lower molds 61 and 62 and pieces 64 fixed to a holder 63, arranged in a loop in the circumferential direction of a tire as shown in FIGS. 12(a) and 12(b) is employed in large quantities. The above piece 64 is generally cast by a die cast method in which a molten metal is poured into a metal mold at a high temperature and a high pressure to be cast for each pitch of a tread pattern and these pieces are combined together according to a pitch variation and mounted to the above holder 63.

In general, to discharge air in the inside of a mold or a gas generated by vulcanization to the outside of the mold, an air bleeder through hole called "vent hole", or a hole or pore having a very small diameter such as an air vent or exhaust passage for gassing is formed in the above crown mold 51 and the piece 64. However, a rubber material flows into the above vent hole at the time of vulcanizing and molding a tire so that a rubber projection called "spew" is formed on the surface of a product tire. Therefore, the work of removing the spew is required after molding.

In the method in which the air vent or exhaust passage is formed, as the above air vent or the exhaust passage is small in size and a surface projection having a complex shape is existent therearound, it is difficult to form a hole or pore having a desired diameter. For example, in the case of milling, as the width of a slit to be formed is very small, the cutter strength and the processing depth are limited and the processing time becomes very long. In the case of discharge processing, the manufacture of an electrode is necessary, and the processing depth is limited due to limitations such as the removal of cutting powders and the curvature of the electrode. Laser beam processing making use of a laser such as $CO_2$ laser or YAG laser is conceivable but the processing depth is limited due to the focusing distance of a laser beam when the width of a groove is 0.1 mm or less.

Since the size of the above air vent or the exhaust passage is limited by a tool in use, a very small hole or pore cannot be formed with high accuracy. As a result, a rubber material which becomes a fluid by vulcanizing heat at the time of molding a tire enters the above hole or pore and a large number of spews are formed on the surface of the vulcanized tire, thereby impairing the appearance of the tire, or clogging occurs due to the cuttings of the spews in the vulcanizing mold.

Figure 13:
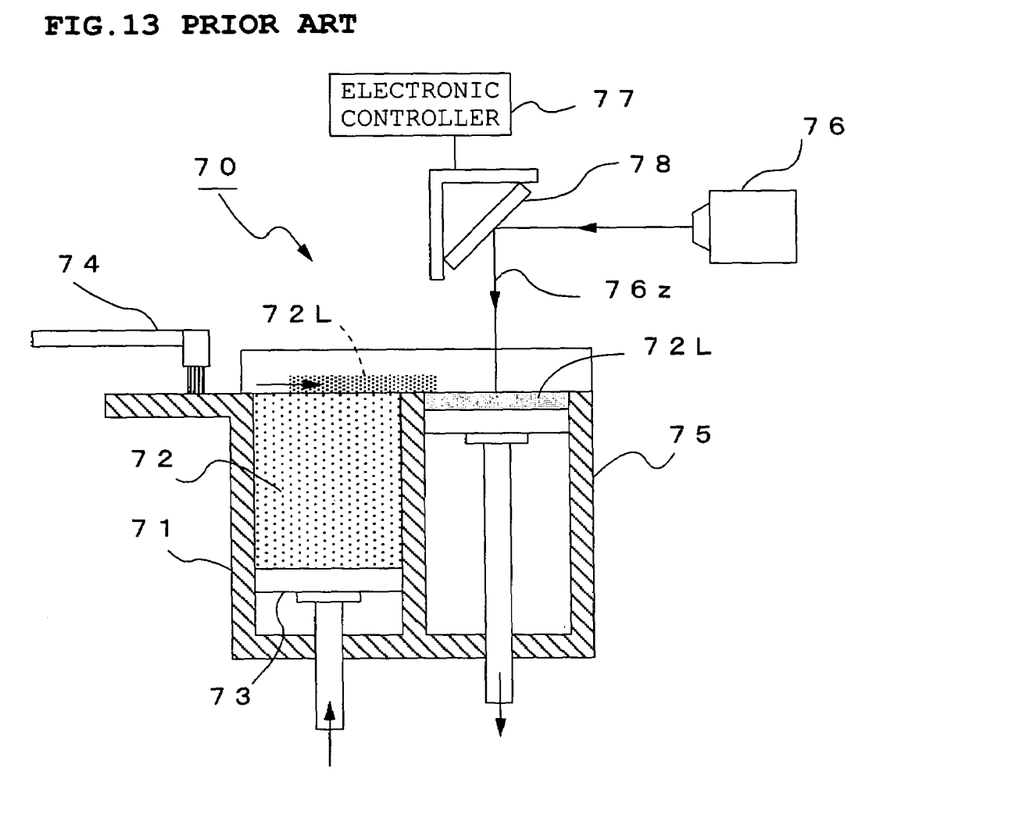
FIG. 13 is a diagram showing an example of a mold laser sintering apparatus.

To cope with these, there is proposed a process for directly manufacturing a tire vulcanizing mold using a 3-D image of a tire to be manufactured without using a tool (for example, refer to JP-A 10-244540) (the term "JP-A" as used herein means an "unexamined published Japanese patent application"). In this method, a tire vulcanizing mold is manufactured by a powder sintering method in which sinterable powders of a metal material or ceramic-based material are heated and sintered by heating means to form a laminate of layers as at least part or all of the mold. The apparatus used in this method is, for example, a mold laser sintering apparatus 70 marketed by EOS Co., Ltd. or 3D Systems (of the U.S.) as shown in FIG. 13. In this apparatus 70, powder particles 72 having an average particle size of 30 to 100 μm are stored in a holding chamber 71, a lifting plate 73 in the above holding chamber 71 is moved up by a predetermined amount to take out a powder layer 72L having a thickness of 0.2 to 0.5 mm, and this layer 72L is transferred into a collection chamber 75 installed next to the holding chamber 71 by a distribution doctor blade 74 and heated and sintered by a laser beam 76z from a laser apparatus 76 as local heating means so as to form a laminated sintered body.

The direction of a mirror 78 for controlling the optical path of the laser beam 76z is controlled by an electronic controller 77 based on the prestored CAD drawing of a tire, the above powder layer 72L is scanned with the above laser beam 76z to be sintered within the space whose boundary is set to a predetermined contour so as to form each layer of the laminated sintered body having the above predetermined contour. By repeating this step, a tire vulcanizing mold composed of a laminated sintered body having a fine projection or an extremely small-diameter hole or pore such as an air vent or exhaust passage which has been difficult to machine can be manufactured.

High strength enough to stand the above vulcanizing conditions is required for the tire vulcanizing mold because a plurality of sector molds are tightly secured at a high pressure at the time of molding.

Although a member having a complex shape can be obtained in a tire vulcanizing mold manufactured by the above powder sintering method, as the sintered portion is porous, it has lower density than a conventional cast type mold and cannot obtain sufficiently high strength required for a tire vulcanizing mold.

Figure 14A:
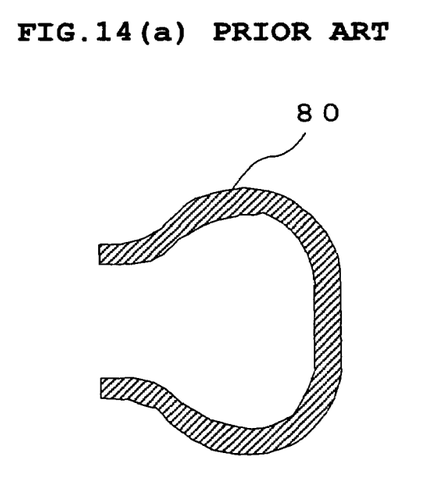
FIGS. 14(a) and 14(b) are diagrams showing a tire vulcanizing mold having a hybrid structure of the prior art.

Meanwhile, when the above tire vulcanizing mold is manufactured by casting, mechanical processing or a combination of casting and mechanical processing, the number of processing steps is large and the strength of a tire vulcanizing mold 80 is uniform as shown in FIG. 14(a) as the same material is used, thereby making it difficult to provide high strength only to a desired portion. Therefore, to secure required strength, the strength of the whole tire mold must be increased with result of a lot of waste.

Figure 14B:
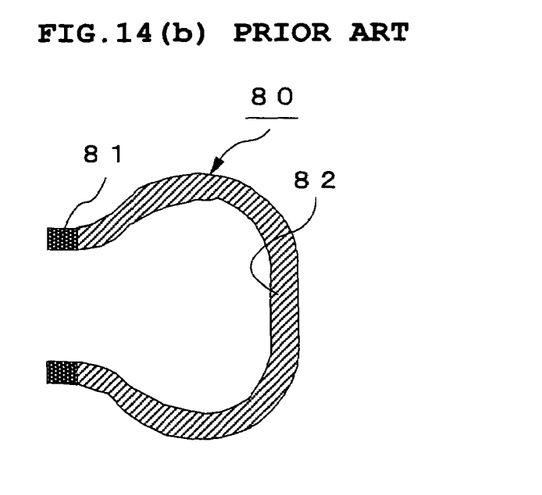

As shown in FIG. 14(b), a hybrid structure that a high strength material such as iron is used in the mating portions 81 of the tire vulcanizing mold 80 and aluminum is used in other portions including a tire crown portion 82 in consideration of weight and heat conductivity is employed. However, this further increases the number of processing steps and boosts costs.

It is an object of the present invention which has been made in view of the above problems of the prior art to provide a process for manufacturing a tire vulcanizing mold having sufficiently high strength and durability efficiently, which is capable of forming a portion having a complex shape of the inner wall of a mold and an air vent or exhaust passage with high accuracy.

SUMMARY OF THE INVENTION

According to a first aspect of the present invention, there is provided a process for manufacturing a tire vulcanizing mold, comprising making at least part of a mold element for a tire tread portion out of a sintered member and a mold element for the mating portions of the mold out of a member having fewer pores than the sintered member or no pores in order to provide a density distribution to the mold. Thereby, the weight of the mold can be easily reduced while required strength is ensured.

According to a second aspect of the present invention, there is provided a process for manufacturing a tire vulcanizing mold, wherein part or all of the tire vulcanizing mold is manufactured by a powder sintering method in which sinterable powders are heated and sintered by local heating means such as a laser apparatus or microwave oscillator to form layers, wherein a low-density sintered body is used in a portion not requiring strength and having a complex structure of a tire crown portion, and a high-density sintered body is used in portions requiring strength such as a portion having few projections of the tire crown portion and the mating portions of the mold to provide a density distribution to the sintered body constituting part or all of the mold. Thereby, air bleeding can be carried out without using a vent hole and satisfactory strength as the mold can be ensured.

According to a third aspect of the present invention, there is provided a process for manufacturing a tire vulcanizing mold, wherein the powders are heated and sintered by applying a laser beam and a density distribution is provided to the sintered body by controlling the output of the laser beam.

According to a fourth aspect of the present invention, there is provided a process for manufacturing a tire vulcanizing mold, wherein the powders are heated and sintered by applying a laser beam, and a density distribution is provided to the sintered body by controlling the exposure time of the laser beam.

According to a fifth aspect of the present invention, there is provided a process for manufacturing a tire vulcanizing mold, wherein the porosity of the sintered body is changed by varying the size of the powders when the powders are heated and sintered.

According to a sixth aspect of the present invention, there is provided a process for manufacturing a tire vulcanizing mold, wherein the powders are metal or alloy powders.

According to a seventh aspect of the present invention, there is provided a process for manufacturing a tire vulcanizing mold, wherein the powders are aluminum powders.

According to an eighth aspect of the present invention, there is provided a process for manufacturing a tire vulcanizing mold, wherein the tire vulcanizing mold is a piece type tire mold comprising a plurality of pieces for forming a tread pattern on a side in contact with the tread forming portion of a tire, and some or all of the pieces are manufactured by the powder sintering method.

According to a ninth aspect of the present invention, there is provided a process for manufacturing a tire vulcanizing mold, wherein the plurality of pieces are integrally manufactured by the powder sintering method, and an air bleeder slit is formed at the boundary between adjacent pieces by weakening or omitting the application of a laser beam to the powders in a predetermined area between the pieces.

According to a tenth aspect of the present invention, there is provided a process for manufacturing a tire vulcanizing mold, wherein the pieces are each manufactured by the powder sintering method, and an air bleeder slit is formed in piece dividing surfaces by weakening or omitting the application of a laser beam to at least some or all of powders in contact with the piece dividing surfaces of the piece.

According to an eleventh aspect of the present invention, there is provided a process for manufacturing a tire vulcanizing mold, wherein a mold element arranged at a place where an air bank of a tire crown portion is readily formed, such as a place around the projection or an intersection between the projections is manufactured by the powder sintering method and the mold element composed of this sintered body is assembled with a separately manufactured mold body or piece.

According to a twelfth aspect of the present invention, there is provided a process for manufacturing a tire vulcanizing mold, wherein the mold element is set in a mold for casting the mold body or the piece and assembled with the mold body or piece at the time of casting.

According to a thirteenth aspect of the present invention, there is provided a process for manufacturing a tire vulcanizing mold, wherein the mold element is buried in the separately cast mold body or piece.

According to a fourteenth aspect of the present invention, there is provided a process for manufacturing a tire vulcanizing mold, wherein to manufacture at least part or all of the mold or at least some or all of the pieces by the powder sintering method in which sinterable powders are heated and sintered to form layers, a tire 3-D CAD is used to create a model of the tire, lamination models are created by dividing this model with parallel planes having a predetermined angle, and the powders are heated and sintered for each layer based on the lamination models.

According to a fifteenth aspect of the present invention, there is provided a process for manufacturing a tire vulcanizing mold, wherein the lamination pitch is 0.1 to 0.5 mm.

According to a sixteenth aspect of the present invention, there is provided a tire vulcanizing mold manufactured by heating and sintering sinterable powders with local heating means to laminate layers as part or all of the tire vulcanizing mold, wherein a member for a tire tread portion is a sintered member and a member for the mating portions of the mold is a member having few pores such as a sintered member having higher density, that is, lower porosity than the sintered member, or a member having no pores such as a member manufactured by melting a metal or alloy.

According to a seventeenth aspect of the present invention, there is provided a tire vulcanizing mold, wherein part or all of the tire vulcanizing mold is manufactured by heating and sintering sinterable powders with local heating means to laminate layers.

According to an eighteenth aspect of the present invention, there is provided a tire vulcanizing mold, wherein a mold element arranged around the projection of at least a tire crown portion is manufactured by the powder sintering method.

According to a nineteenth aspect of the present invention, there is provided a tire vulcanizing mold, wherein the tire vulcanizing mold is a piece type tire mold comprising a plurality of pieces for forming a tread pattern on a side in contact with the tire tread forming portion of a tire.

According to a twentieth aspect of the present invention, there is provided a process for manufacturing a tire vulcanizing mold, comprising the steps of:

manufacturing at least part or all of a mold by a powder sintering method in which sinterable powders are heated and sintered to laminate layers, and infiltrating a metal or alloy into the pores of the laminated sintered body of the mold.

According to a twenty-first aspect of the present invention, there is provided a process for manufacturing a tire vulcanizing mold, wherein the density of the mold is controlled by adjusting the infiltration of the metal or alloy.

According to a twenty-second aspect of the present invention, there is provided a process for manufacturing a tire vulcanizing mold, wherein the powders are metal or alloy powders.

According to a twenty-third aspect of the present invention, there is provided a process for manufacturing a tire vulcanizing mold, wherein the powders are aluminum powders.

According to a twenty-fourth aspect of the present invention, there is provided a process for manufacturing a tire vulcanizing mold, wherein the metal or alloy to be infiltrated is copper, aluminum, or copper or aluminum alloy.

According to a twenty-fifth aspect of the present invention, there is provided a tire vulcanizing mold manufactured by forming part or all of the mold by a powder sintering method in which sinterable powders are heated and sintered to laminate layers, wherein a metal or alloy is infiltrated into the pores of the laminated sintered body of the mold.

According to a twenty-sixth aspect of the present invention, there is provided a tire vulcanizing mold, wherein the powders are aluminum powders, and the alloy to be infiltrated is an aluminum alloy.

According to a twenty-seventh aspect of the present invention, there is provided a tire vulcanizing mold, wherein a blade planting groove portion for forming the sipe of a tire of the mold is composed of the laminated sintered body.

According to a twenty-eighth aspect of the present invention, there is provided a tire vulcanizing mold, wherein a blade for forming the sipe of a tire is composed of the laminated sintered body.

According to a twenty-ninth aspect of the present invention, there is provided a tire vulcanizing mold, wherein a slit groove portion for discharging air of the mold is composed of the laminated sintered body.

DESCRIPTION OF THE PREFERRED EMBODIMENT

Preferred embodiments of the present invention will be described hereinbelow with reference to the accompanying drawings.

Embodiment 1

Figure 1A:
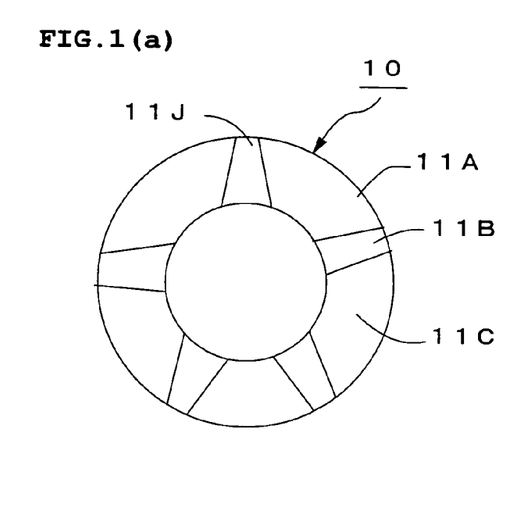
FIGS. 1(a) and 1(b) are diagrams showing the constitution of a tire vulcanizing mold according to Embodiment 1 of the present invention.
Figure 1B:
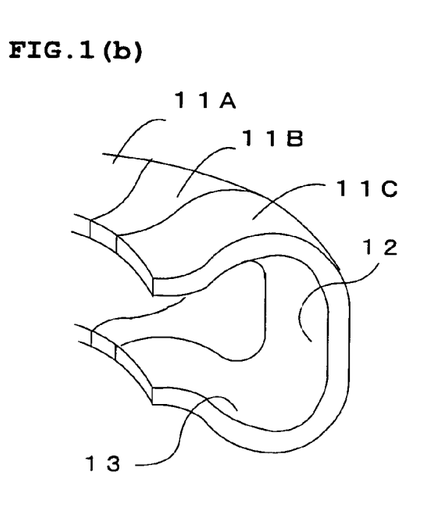
Figure 2A:
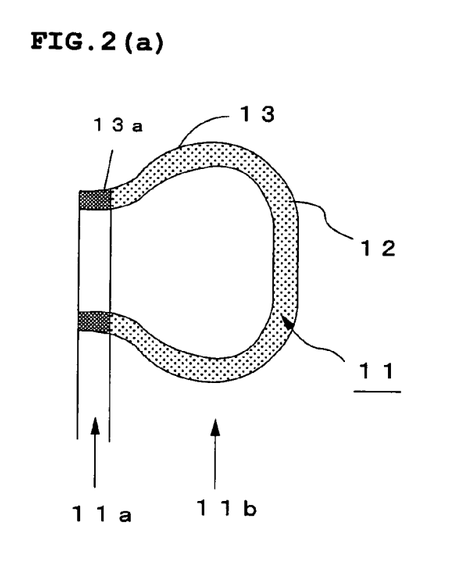
FIGS. 2(a) and 2(b) are diagrams showing the density distribution of the tire vulcanizing mold of Embodiment 1.
Figure 2B:
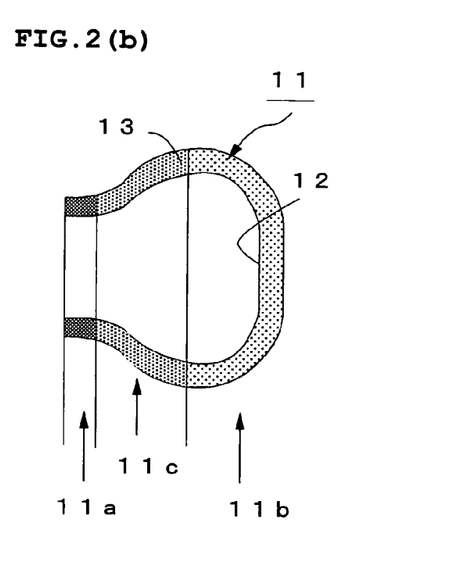

FIGS. 1 (a) and 1 (b) show the constitution of a tire vulcanizing mold 10 according to this embodiment. This tire vulcanizing mold 10 is a split type mold consisting of a plurality of sector molds 11 (11A to 11J) which are interconnected in a loop. In this embodiment, a crown portion 12 having the sectional form of a tire crown portion and side portions 13 in contact with side tread portions are formed integrally on the tire side (inner side) of the above sector mold 11 by the above-described powder sintering method. Powders are sintered by changing heating and sintering conditions so that a portion including the crown portion 12 which does not require strength but has a complex structure is made a sparse portion 11b having a low density (therefore, having a lot of pores) of a sintered body and portions 13a corresponding to the mating portions of the mold of the side portions 13 (to be referred to as "mating portions" hereinafter), which require strength, are made dense portions 11a having high density (therefore, having few pores) at the time of molding as shown in FIG. 2 (a) Thereby, the sector mold 11 can be molded in a single step, thereby making it possible to obtain a tire vulcanizing mold 10 having a hybrid structure as shown in FIG. 14 (b) easily. To provide a density distribution to the tire vulcanizing mold 10, for example, as shown in FIG. 2(b), a displacement portion 11c whose density becomes lower toward the crown portion 12, that is, whose porosity of the sintered body becomes higher may be interposed between the crown portion 12 and the above mating portions 13a.

A description is subsequently given of the process for manufacturing the above sector mold 11.

Figure 3A:
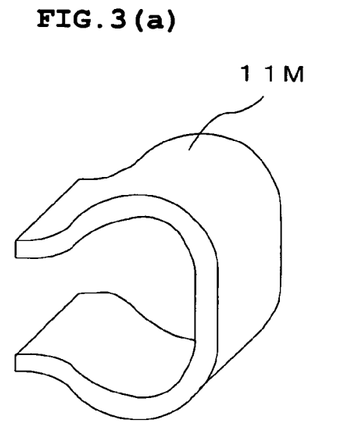
FIGS. 3(a) to 3(d) are diagrams showing a process for manufacturing the tire vulcanizing mold of Embodiment 1.
Figure 3B:
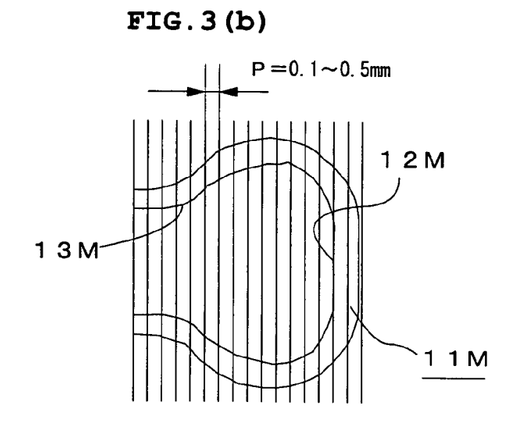

A 3-D solid model of the tire vulcanizing mold 10 is constructed on CAD. A core unit whose circumference is to be divided into 10 is modeled and then divided into segments 11M corresponding to the sector molds 11 as shown in FIG. 3(a). The lamination direction of each segment 11M is set as shown in FIG. 3(b). This lamination direction is suitably determined in consideration of processing time, strength at the time of completion and nesting (storage condition of powders) in the above mold laser sintering apparatus 70. In this embodiment, the lamination direction is from the inner diameter to the outer diameter of the tire but is not limited to this. The above lamination direction may have the same angle in each segment. 11M or may have a different angle for each segment 11M.

The lamination pitch P in a plane perpendicular to the above lamination direction is set. This laminating pitch P corresponds to the thickness of each layer 11m of the above segment 11M and generally about 0.1 to 0.5 mm. The optimum value is determined in consideration of molding accuracy and processing time. When the pitch of a layer including a crown portion 12M having a complex structure is made small and the pitch of a side portion 13M is made large, the number of layers can be reduced, and sintering can be carried out efficiently.

Figure 3C:
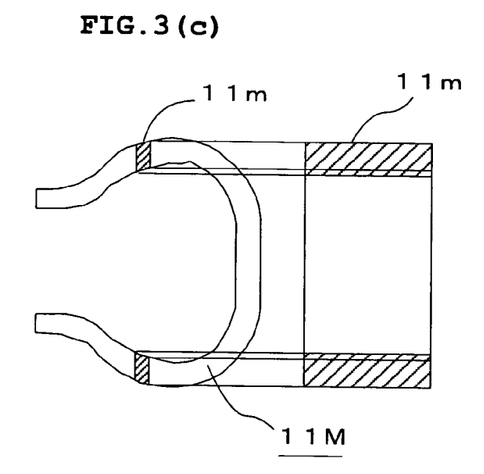

Slice data on each layer 11m as shown in FIG. 3(c) are created. The plane shape on each section of the lamination pitch and the density distribution on the plane and in the depth direction of each layer 11m are set in the lamination order of the layers 11m, and the above shape data and the density data are output as the control data of the electronic controller 77 of the mold laser sintering apparatus 70.

Figure 3D:
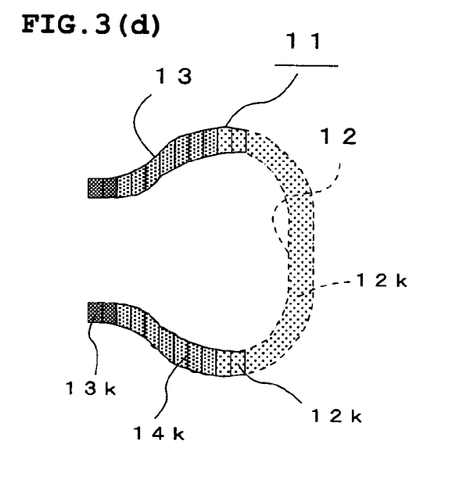

The electronic controller 77 controls the mold laser sintering apparatus 70 based on the above data to mold the sector molds 11 corresponding to the above respective segments 11M from the inner diameter side of the tire one after another. Stated more specifically, an aluminum or stainless steel powder layer having a thickness corresponding to the above lamination pitch P is formed and sintered and hardened by exposure to a laser beam by following the pitch sectional form of each layer 11m represented by the above slice data, and this procedure is repeated to mold the crown portion 12 and the side portions 13 of the above sector mold 11 integrally. To mold the sector mold 11 from the inner diameter side of the tire, in this embodiment, as shown in FIG. 3(d), a density distribution is provided on the planes and in the depth directions of mold elements 12k to 14k corresponding to the respective layers 11m of the above segment 11M by increasing or reducing the output of the laser beam at each position or by extending or shortening the exposure time of the laser beam. Stated more specifically, a mold element 12k including the crown portion 12 which has a complex structure and does not require strength is made low in density and a mold element 13k for a portion which requires strength like a portion corresponding to the mating portion 13a of the mold of the side portion 13 is made high in density by controlling the output or exposure time of the laser beam. A mold element 14k between the crown portion 12 and the above mating portion 13a is made lower in density toward the crown portion 12 by changing the output or exposure time of the laser beam so that a sector mold 11 having a sparse portion 11b, dense portion 11a and displacement portion 11c can be molded as shown in FIG. 2(b).

To provide the above density distribution, the output or exposure time of the laser beam may be changed for each predetermined thickness or continuously.

Thereby, the mating portion 13a of the above tire vulcanizing mold 10 is made dense and therefore has high strength and the crown portion 12 is made sparse and therefore becomes lightweight, thereby making it possible to obtain a mold having a hybrid structure in a single step.

Since the above crown portion 12 is composed of a low-density porous sintered body, air in the inside of the vulcanizing mold 10 or a gas generated at the time of vulcanizing a tire can be discharged to the outside of the mold 10 without using a vent hole.

In this Embodiment 1, a 3-D solid model of the tire vulcanizing mold 10 is constructed on CAD, lamination models (segments 11M) the optimum value of the pitch of which is determined in consideration of molding accuracy and processing time are created by dividing this model in a predetermined direction, slice data on each layer 11m corresponding to the lamination pitch of the segment 11M is created, the sector mold 11 of the tire vulcanizing mold 10 is manufactured by the above powder sintering method based on the slice data, and the density of a sintered body is controlled by increasing or reducing the output of a laser beam applied to the powders or by extending or shortening the exposure time of the laser beam to provide a density distribution on the plane and in the depth direction of a mold element corresponding to each layer 11m. Therefore, the sector mold 11 having a hybrid structure can be manufactured easily in a single step.

The number of pores communicating with the tire tread forming surface is increased by reducing the density of a sintered body constituting the crown portion 12, thereby making it possible to discharge air in the inside of the tire vulcanizing mold 10 or a gas generated at the time of vulcanizing a tire to the outside of the above mold 10 without using a vent hole.

In the above Embodiment 1, the split type vulcanizing mold 10 has been described. When the lamination direction has the same angle for all the segments 11M, the whole core (tire vulcanizing mold 10) can be manufactured as a single unit.

Figure 4A:
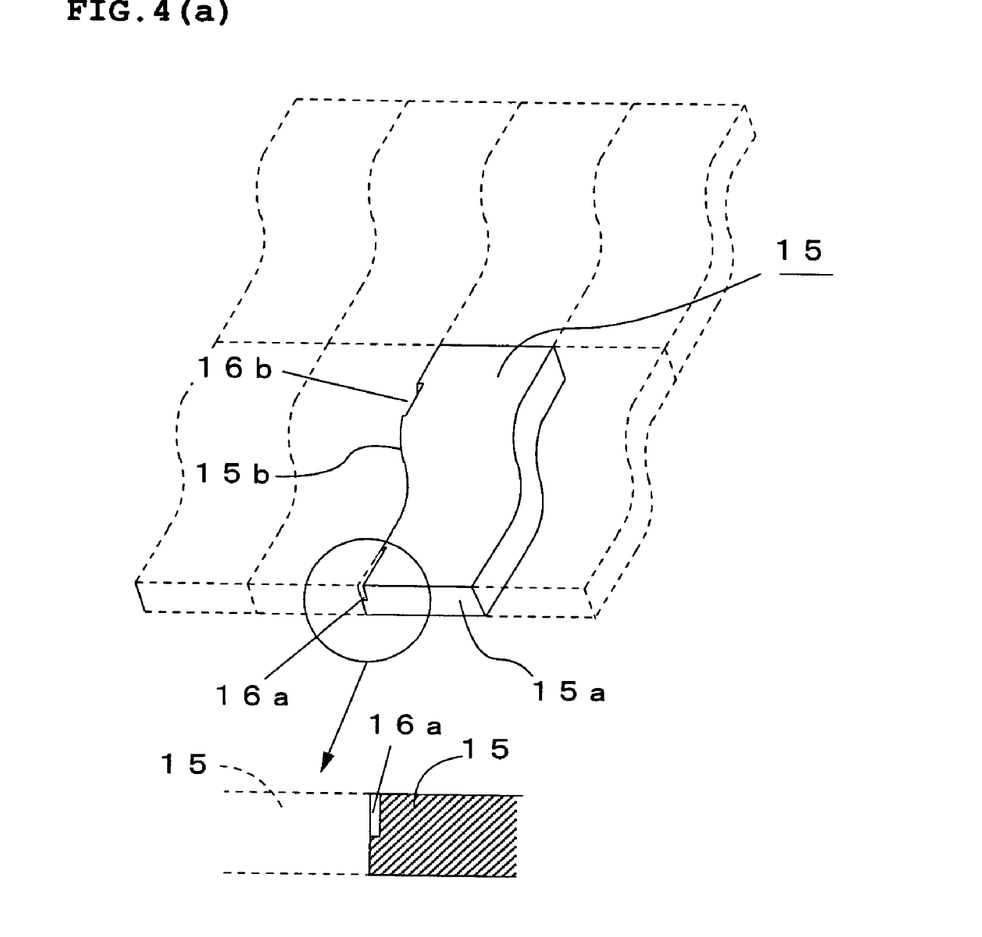
FIGS. 4(a) and 4(b) are diagrams of another example of the vulcanizing mold of present invention.
Figure 4B:
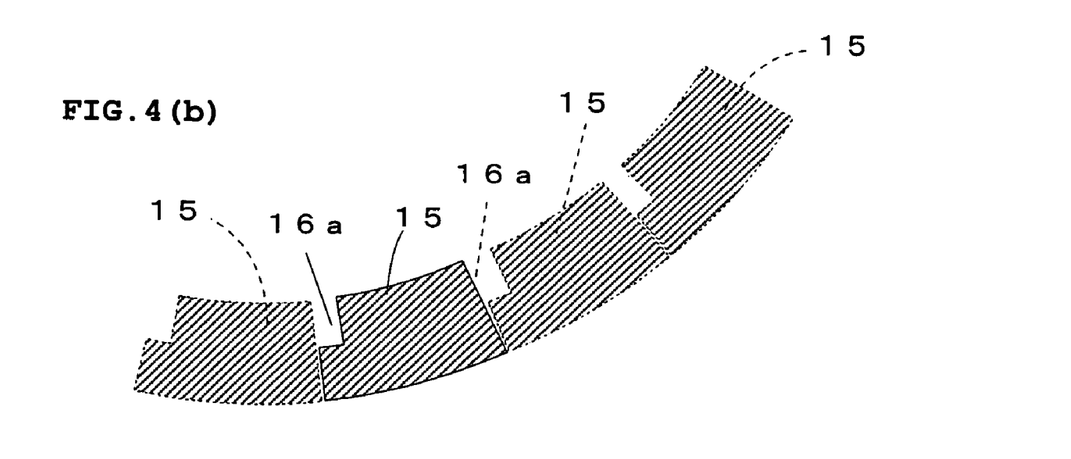

It is needless to say that the present invention can be applied not only to the above full type mold and split type vulcanizing mold but also to a piece type tire mold. More specifically, as shown in FIGS. 4(a) and 4(b), pieces 15 are manufactured by the above powder sintering method and assembled with an unshown holder. When air bleeder slits 16a and 16b are formed in the above piece dividing surfaces 15a and 15b by weakening or omitting the application of a laser beam to at least some or all of the powders in contact with the piece dividing surfaces 15a and 15b of the above piece 15, air bleeding can be fully carried out even if the sintering degree of a sintered body constituting the piece 15 is increased to improve density, thereby making it possible to further improve the durability of the vulcanizing mold.

Figure 5A:
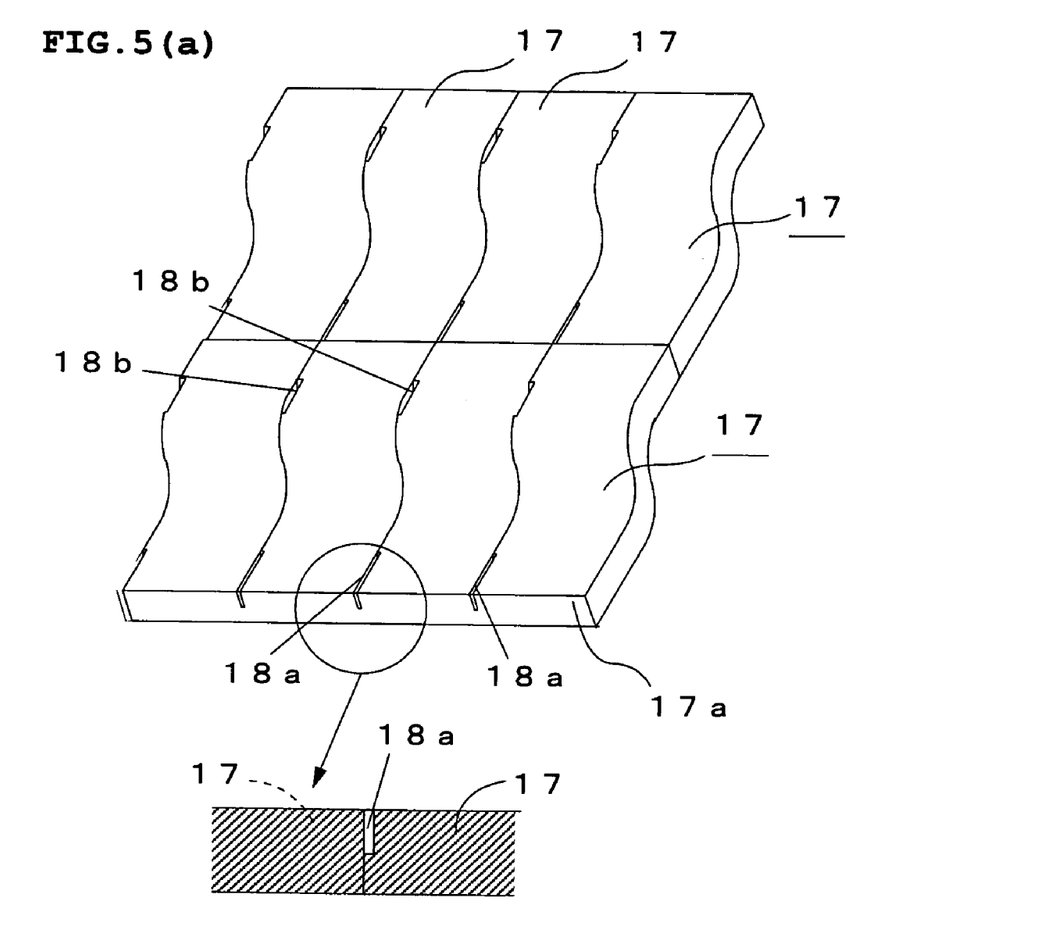
FIGS. 5(a) and 5(b) are diagrams of still another example of the vulcanizing mold of the present invention.
Figure 5B:
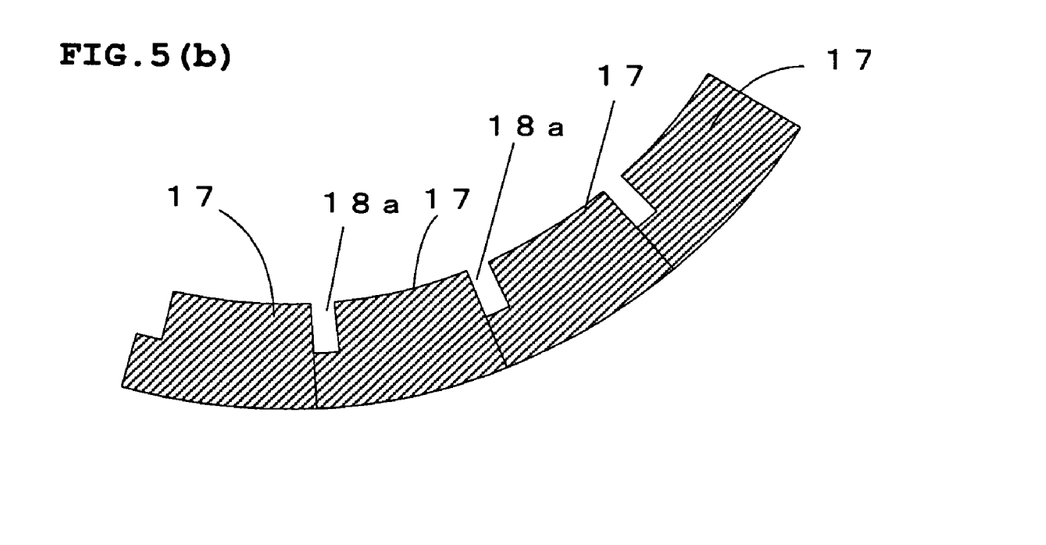

Alternatively, as shown in FIGS. 5(a) and 5(b), a plurality of pieces 17 may be produced integrally by the above powder sintering method to manufacture a piece integrated sector mold. Thereby, it is not necessary to assemble each piece 17, whereby the lead time of manufacture can be greatly shortened. In this case, air bleeder slits 18a and 18b are preferably formed at the boundary between the above pieces 17 and 17 by weakening or omitting the application of a laser beam to at least some or all of the powders in a predetermined area between the pieces 17 and 17.

In the above embodiment, a density distribution is provided to the sintered body by changing the heating and sintering conditions such as the output or exposure time of the laser beam. The porosity of a sintered body constituting the crown portion 12 may be increased and the porosity of a sintered body constituting the mating portion 13a may be reduced by changing the size of the above powders to provide a density distribution to the sintered body. The heating and sintering conditions and the size of the powders may be both changed.

Embodiment 2

Figure 6A:
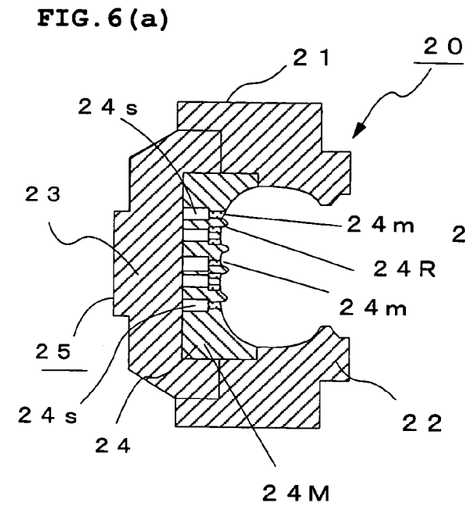
FIGS. 6(a) and 6(b) are diagrams showing the constitution of a tire vulcanizing mold according to Embodiment 2 of the present invention.
Figure 6B:
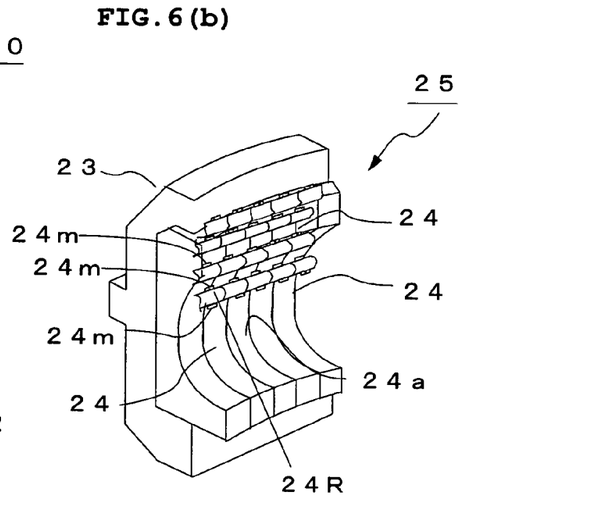

FIGS. 6(a) and 6(b) show the constitution of a tire vulcanizing mold 20 according to Embodiment 2. This mold 20 consists of a plurality of sector molds 25, each consisting of upper and lower molds 21 and 22 in contact with tire side portions and a plurality of vulcanizing mold pieces (to be referred to as "pieces" hereinafter) 24 fixed to a holder 23, arranged in a loop in the circumferential direction of a tire. A tread marking surface 24a (portion exposed to the inner wall of the mold 20) which is a recessed portion of each piece 24 is a tire forming surface, that is, a portion to be in close contact with green tire rubber to be vulcanized.

Figure 7:
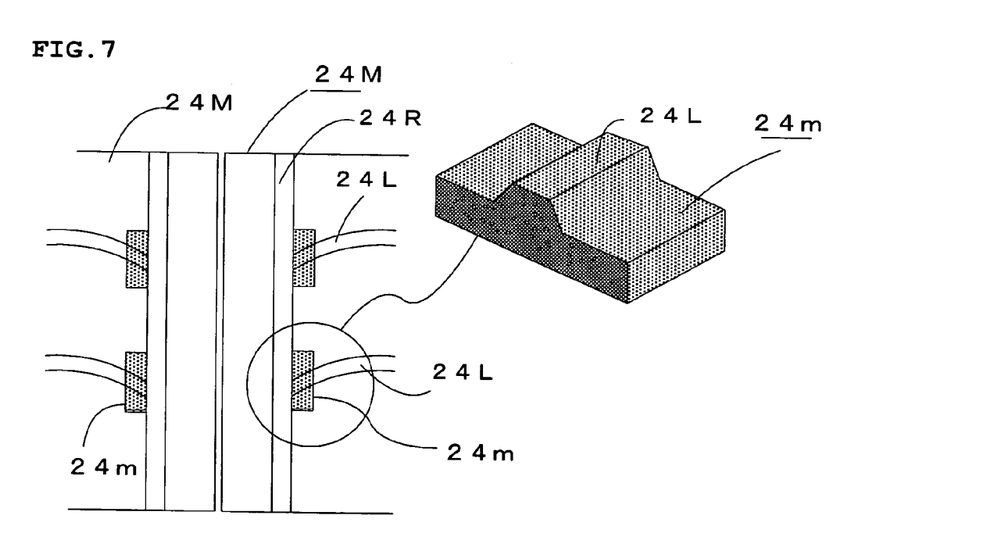
FIG. 7 is a diagram showing the outline of a tire tread forming surface of a vulcanizing mold piece according to Embodiment 2 of the present invention.

The tire forming surface 24a of each piece 24 has projections (to be referred to as "rib portions" hereinafter) 24R corresponding to a vertical groove pattern and projections (to be referred to as "lug portions" hereinafter) 24L corresponding to a horizontal groove pattern (lug pattern) of a tire tread as shown in FIG. 7. In this embodiment, a mold element 24m situated at an intersection between the rib portion 24R and the lug portion 24L of the above piece 24 is composed of a porous member formed by sintering metal or alloy powders in accordance with the above powder sintering method, and exhaust passages communicating with the unshown exhaust holes of the holder 23 through spaces 24s between the piece 24 and the holder 23 are formed in the piece body 24M of the above piece 24 with which the above mold elements 24m are assembled.

The above mold element 24m is directly manufactured from CAD data by spreading aluminum powders or stainless steel powders to a layer of about 0.1 to 0.5 mm, sintering them with a laser beam to a desired form to harden them and repeating this procedure. The above mold element 24m is set in a mold for casting the above piece 24 and integrated with the piece body 24M by casting. Alternatively, the piece body 24M may be cast separately, and a hole for accepting the above mold element 24m may be formed in this piece body 24M to bury the above mold element 24m.

Since the above intersection portion becomes an air bank where air in the inside of the mold or a gas generated at the time of vulcanizing a tire readily stays, the above air or gas can be discharged to the outside of the tire vulcanizing mold 20 without using a vent hole by installing the mold element 24m composed of a porous member in the above intersection portion. The density of a sintered body of a portion which hardly becomes an air bank in the vicinity of the piece body 24M of the above mold element 24m is preferably increased by raising the output of a laser beam or extending the exposure time of the laser beam.

Air bleeding can be carried out more efficiently by changing the porosity by varying the size of the powders to be sintered according to the pattern shape of the piece 24 and the location of the mold element 24m.

Since the above mold element 24m is used in only part of the tire crown forming surface of the tire vulcanizing mold 20, even when pressure is applied to the sector mold 25 at the time of clamping the mold 20, no strength problem arises.

In this Embodiment 2, the mold element 24m composed of a porous member formed by sintering powders in accordance with the powder sintering method is installed in the intersection portion between the rib portion 24R and the lug portion 24L formed on the tire forming surface 24a of the piece 24 where air in the inside of the tire vulcanizing mold 20 or a gas generated at the time of vulcanizing a tire readily stays, and exhaust passages communicating with the exhaust holes of the above mold 20 are formed in the piece body 24M of the above piece 24 with which the above mold elements 24m are assembled. Therefore, the above air or gas can be easily discharged to the outside of the tire vulcanizing mold 20 without using a vent hole. Since the above mold element 24m is used in only part of the tire crown forming surface of the tire vulcanizing mold 20, even when a porous member is used, the strength of the tire vulcanizing mold 20 can be fully maintained.

In the above Embodiment 2, exhaust passages communicating with the exhaust holes of the mold 20 are formed in the piece body 24M. When the mold element 24m is arranged at a position in contact with the piece dividing surface or a slit communicating with the piece dividing surface and the above mold element 24m is formed, the exhaust passages in the above piece body 24M are not always necessary.

In the above embodiment, the tire vulcanizing mold 20 is a piece type tire mold. It is needless to say that the present invention can be applied to other type of vulcanizing mold such as a full type mold or split type mold.

Embodiment 3

Figure 8A:
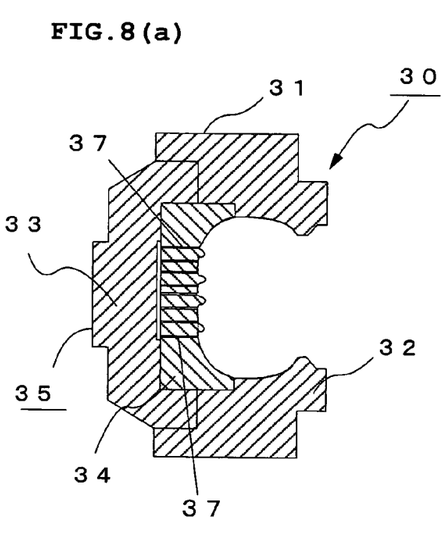
FIGS. 8(a) and 8(b) are diagrams showing the constitution of a tire vulcanizing mold according to Embodiment 3 of the present invention.
Figure 8B:
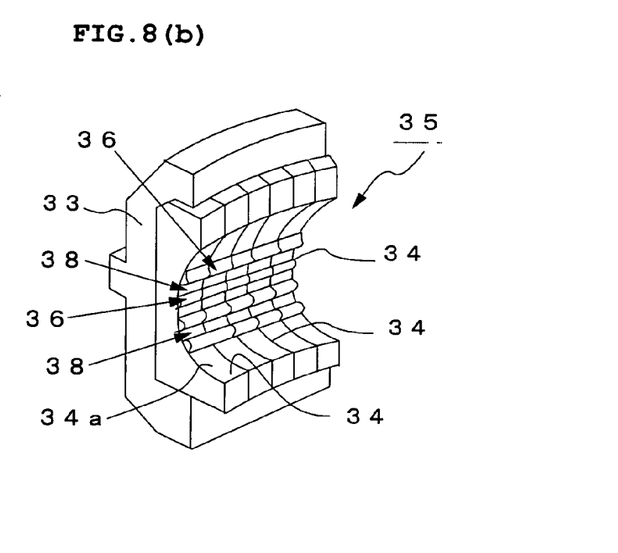

FIGS. 8(a) and 8(b) show the constitution of a tire vulcanizing mold 30 according to this Embodiment 3. This mold 30 consists of a plurality of sector molds 35, each consisting of upper and lower molds 31 and 32 in contact with tire side portions and a plurality of pieces 34 fixed to a holder 33, arranged in a loop in the circumferential direction of a tire. The tread marking surface (portion exposed to the inner wall of the mold 30) 34a which is a recessed portion of each piece 34 is a tire forming surface, that is, a portion to be in close contact with green tire rubber to be vulcanized.

Figure 9:
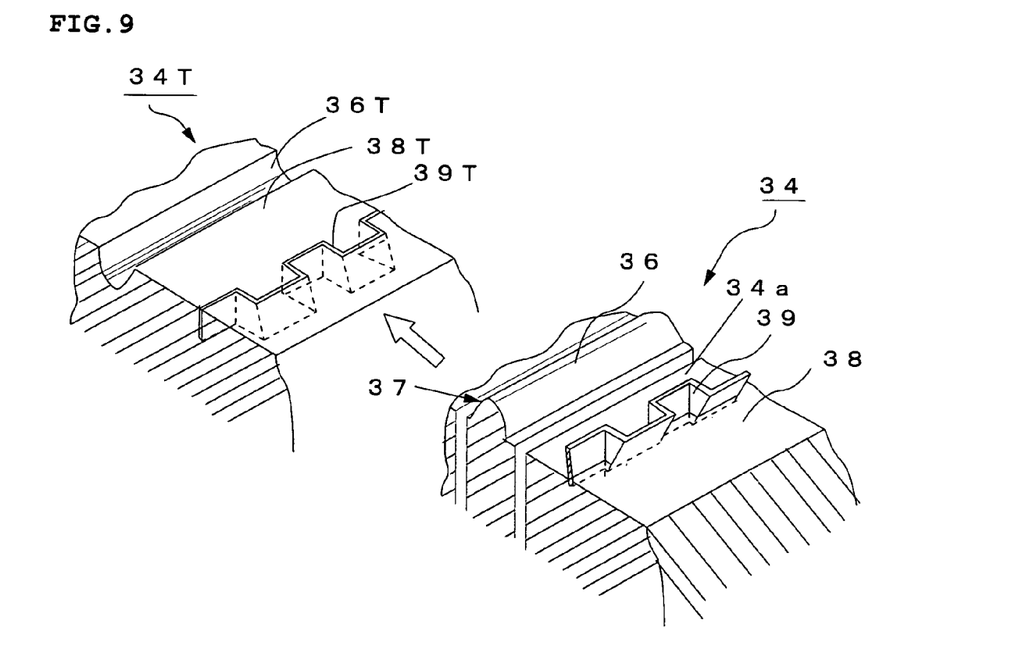
FIG. 9 is an enlarged view of the key section of a vulcanizing mold piece according to Embodiment 3.

As show in FIG. 9, a plurality of slits 37 for discharging a gas generated at the time of vulcanizing a tire to the outside of the mold are formed in the above piece 34 in the vicinity of projections 36 formed on the above tread marking surface 34a, corresponding to the groove portions 36T of the tire tread portion 34T, and a blade 39 for forming a sipe 39T is formed in the groove portion 38 corresponding to the block 38T of the tire tread portion 34T.

In this embodiment, after the piece 34 having the above slits 37 and the blade 39 is manufactured by the above powder sintering method, the above piece 34 is impregnated with a metal or alloy to control the density of the above piece 34 so as to ensure the strength and air permeability of the mold 30

A description is subsequently given of the process for manufacturing the piece 34 of the present invention.

First, a similar sintering apparatus as the above mold laser sintering apparatus is used to heat metal powders (SUS powders) which can be sintered and have an average particle diameter of 10 to 80 μm with a laser beam as local heating means based on the preset CAD drawing of the piece 34 to mold 3,000 to 5,000 layers at a lamination pitch of 0.02 to 0.2 mm so as to manufacture the piece 34 having a plurality of slits 37 with a width of 0.1 mm or less communicating with exhaust holes formed in the holder 33 and a blade 39 for forming the sipe of a tire tread in the vicinity of projections 36 formed on the tread marking surface 34a which is the recessed portion of the piece 34. As the powder sintering method is the same as the prior art, its detailed description is omitted.

Figure 10:
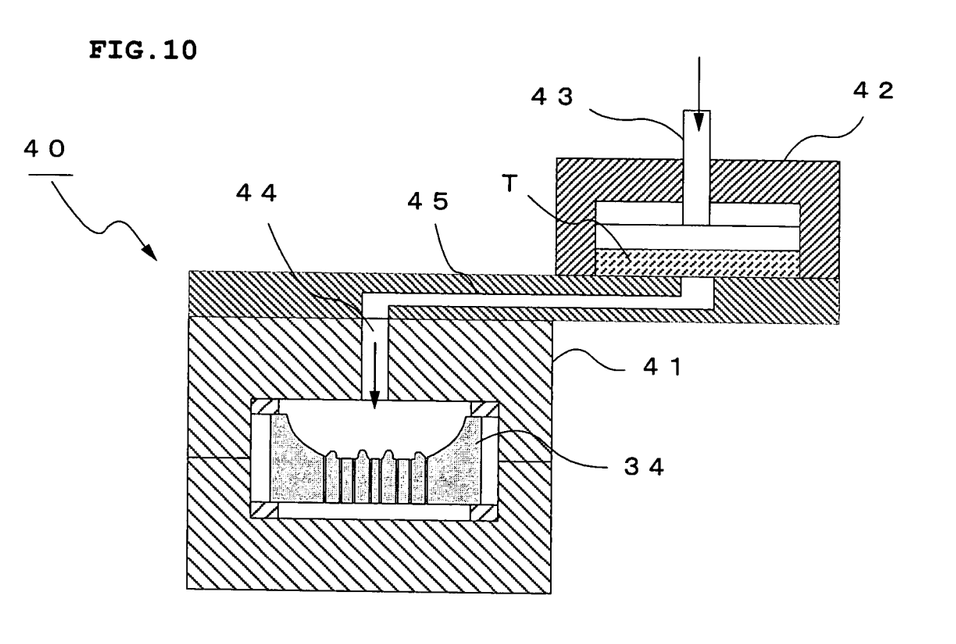
FIG. 10 is a diagram showing the outline of an infiltration apparatus.

In this embodiment, the above manufactured piece 34 is placed in the storage container 41 of an infiltration apparatus 40 as shown in FIG. 10 and heated at a temperature higher than the melting point of a metal T (copper) having a lower melting temperature than SUS constituting the piece 34, and the metal T molten and stored in an infiltration metal supply apparatus 42 is forcedly supplied into a molten metal passage 45 communicating with the molten metal introduction port of the above storage container 41 and introduced into the above storage container 41 to infiltrate the above metal T into the pores of the sintered body constituting the above piece 34.

To infiltrate the above metal T, a container containing the pre-molten metal T may be prepared and the above piece 34 preheated at a predetermined temperature may be immersed in the metal T in the container.

At this point, the infiltration of the above metal T is controlled by adjusting the heating temperature of the above piece 34 and the melting temperature and infiltration time of the above metal T, thereby making it possible to control the density of the sintered body constituting the above piece 34. Since the porosity of the above sintered body is changed by the infiltration of the metal T into the pores of the sintered body constituting the above piece 34, the air permeability of the above tire vulcanizing mold 30 can be controlled by changing the infiltration. Therefore, the strength and air permeability of the above mold 30 can be controlled by suitably setting the type and infiltration conditions of the above metal T.

In this Embodiment 3, after the vulcanizing mold piece 34 having fine slits 37 and blade 39 of the tire vulcanizing mold 30 is manufactured by the powder sintering method, the piece 34 is set in the infiltration apparatus 40 to infiltrate the above metal T into the pores of the sintered body constituting the above piece 34. Therefore, a portion having a complex shape of the inner wall, the fine slits 37 and the blade 39 of the mold 30 can be formed very accurately, and the density of the sintered portion of the mold 30 can be improved, thereby making it possible to greatly improve the strength of the mold 30.

The strength and air permeability of the mold 30 can be ensured by suitably controlling the amount of a metal or alloy to be infiltrated into the pores of the above sintered body.

In the above Embodiment 3, after the piece 34 is manufactured from SUS powders, this piece 34 is impregnated with copper. The material of the piece 34 is not limited to this and may be other metal powders or alloy powders such as aluminum powders which are often used in vulcanizing molds and can be sintered. The metal or alloy to be infiltrated is not limited to the above copper and may be other metal or alloy having a lower melting point than the powders constituting the piece 34. Particularly when aluminum powders are used, the metal to be infiltrated is preferably an aluminum alloy.

In the above embodiment, the blade 39 is directly formed by the powder sintering method. In place of the above blade 39, a blade planting groove portion may be formed and a separately manufactured blade may be planted in this blade planting groove portion.

EXAMPLE

SUS powders having an average particle diameter of 20 µm were used to form about 4,000 layers at a lamination pitch of 0.05 mm by the powder sintering method so as to manufacture a vulcanizing mold piece for a passenger car tire. Copper is infiltrated into the above piece to measure the density and strength of the obtained vulcanizing mold piece. For comparison, a vulcanizing mold piece which was not subjected to infiltration was manufactured to measure its density and strength.

As a result, the vulcanizing mold piece of the present invention which had a density of 60% before infiltration had a density of 98% after infiltration which was 35% or more higher than that of the prior art. The vulcanizing mold piece of the present invention which had a strength of 80 MPa before infiltration had a strength of 580 MPa after infiltration which was about 7 times higher than that of the prior art. Thus it could be confirmed that the vulcanizing mold piece of the present invention has no problem with strength as compared with the cast type vulcanizing mold piece of the prior art.

INDUSTRIAL FEASIBILITY

As having been described above, to manufacture part or all of a tire vulcanizing mold by a powder sintering method in which sinterable powders are heated and sintered by local heating means such as a laser apparatus or microwave oscillator, a low-density sintered body is used in a tire crown portion having a complex structure and not requiring high strength, a high-density sintered body is used in portions requiring high strength such as a portion having few projections of the tire crown portion and the mating portions of a mold, a portion excluding the above sintered portions is formed by casting, and the above sintered bodies are buried in this cast portion to provide a density distribution to the above mold. Therefore, a tire vulcanizing mold having a hybrid structure can be easily manufactured. Accordingly, the number of processing steps is reduced to greatly shorten the lead time of manufacture. Since a low-density sintered body is used in the air bank of the tire crown portion, air can be easily released without using a vent hole.

After at least part or all of the mold is manufactured by the powder sintering method, a metal or alloy is infiltrated into the pores of the above laminated sintered body of the mold, thereby making it possible to form a complex portion of the inner wall, vent holes and exhaust passages of the mold accurately and to improve the density of the sintered body of the mold. Therefore, the strength of the mold can be greatly improved.

What is claimed is:

1. A process for manufacturing a tire vulcanizing mold, comprising making the tire vulcanizing mold out of a plurality of mold elements which have fixed density in the thickness direction of the mold and differ from each other in density to provide a density distribution to the mold, and making at least part of a mold element for a tire tread portion out of a sintered member and a mold element for the mating portions of the mold out of a member having fewer pores than the sintered member or no pores.

2. The process for manufacturing a tire vulcanizing mold according to claim 1, wherein part or all of the tire vulcanizing mold is manufactured by a powder sintering method in which sinterable powders are heated and sintered by local heating means to form layers and the density distribution is provided to the sintered body.

3. The process for manufacturing a tire vulcanizing mold according to claim 2, wherein the powders are heated and sintered by applying a laser beam and a density distribution is provided to the sintered body by controlling the output of the laser beam.

4. The process for manufacturing a tire vulcanizing mold according to claim 2, wherein the powders are heated and sintered by applying a laser beam, and a density distribution is provided to the sintered body by controlling the exposure time of the laser beam.

5. The process for manufacturing a tire vulcanizing mold according to any one of claims 2 to 4, wherein the porosity of the sintered body is changed by varying the size of the powders when the powders are heated and sintered.

6. The process for manufacturing a tire vulcanizing mold according to any one of claims 2 to 4, wherein the powders are metal or alloy powders.

7. The process for manufacturing a tire vulcanizing mold according to claim 6, wherein the powders are aluminum powders.

8. The process for manufacturing a tire vulcanizing mold according to any one of claims 2 to 4, wherein the tire vulcanizing mold is a piece type tire mold comprising a plurality of pieces for forming a tread pattern on a side in contact with the tread forming portion of a tire, some or all of the pieces are manufactured by the powder sintering method, and at least one of the pieces is composed of a plurality of mold elements which have fixed density in the thickness direction and differ from each other in density to provide a density distribution to the piece.

9. The process for manufacturing a tire vulcanizing mold according to claim 8, wherein the plurality of pieces are integrally manufactured by the powder sintering method, and an air bleeder slit is formed at the boundary between adjacent pieces by weakening or omitting the application of a laser beam to the powders in a predetermined area between the pieces.

10. The process for manufacturing a tire vulcanizing mold according to claim 8, wherein the pieces are each manufactured by the powder sintering method, and an air bleeder slit is formed in piece dividing surfaces by weakening or omitting the application of a laser beam to at least some or all of powders in contact with the piece dividing surfaces of the piece.

11. The process for manufacturing a tire vulcanizing mold according to claim 1, wherein a mold element arranged around the projection of at least a tire crown portion is manufactured by the powder sintering method and the mold element composed of this sintered body is assembled with a separately manufactured mold body or piece.

12. The process for manufacturing a tire vulcanizing mold according to claim 11, wherein the mold element is set in a mold for casting the mold body or the piece and assembled with the mold body or piece at the time of casting.

13. The process for manufacturing a tire vulcanizing mold according to claim 11, wherein the mold element is buried in the separately cast mold body or piece.

14. The process for manufacturing a tire vulcanizing mold according to any one of claims 1 to 4 and 11-13, wherein to manufacture at least part or all of the mold or at least some or all of the pieces by the powder sintering method in which sinterable powders are heated and sintered to form layers, a tire 3-D CAD is used to create a model of the tire, lamination models are created by dividing this model with parallel planes having a predetermined angle, and the powders are heated and sintered for each layer based on the lamination models.

15. The process for manufacturing a tire vulcanizing mold according to claim 14, wherein the lamination pitch is 0.1 to 0.5 mm.

16. A tire vulcanizing mold comprising a plurality of mold elements which have fixed density in the thickness direction of the mold and differ from each other in density, wherein a mold element for a tire tread portion is a composed of a sintered body and a mold element for the mating portions of the mold is composed of a member having one of substantially no pores and no pores.

17. The tire vulcanizing mold according to claim 16, wherein part or all of the tire vulcanizing mold is manufactured by heating and sintering sinterable powders with local heating means to laminate layers.

18. The tire vulcanizing mold according to claim 17, wherein a mold element arranged around the projection of at least a tire crown portion is manufactured by the powder sintering method.

19. The tire vulcanizing mold according to any one of claims 16 to 18, wherein the tire vulcanizing mold is a piece type tire mold comprising a plurality of pieces for forming a tread pattern on a side in contact with the tire tread forming portion of a tire, and at least one of the pieces is composed of a plurality of mold elements which have fixed density in the thickness direction and differ from each other in density.

20. A process for manufacturing a tire vulcanizing mold, comprising the steps of:

manufacturing at least part or all of a mold by a powder sintering method in which sinterable powders are heated and sintered to laminate layers, and infiltrating a metal or alloy into the pores of the laminated sintered body of the mold and controlling a density of the laminated sintered body by adjusting the infiltration of the metal or alloy.

21. The process for manufacturing a tire vulcanizing mold according to claim 20, wherein the powders are metal or alloy powders.

22. The process for manufacturing a tire vulcanizing mold according to claim 21, wherein the powders are aluminum powders.

23. The process for manufacturing a tire vulcanizing mold according to claims 20, wherein the metal or alloy to be infiltrated is copper, aluminum, or copper or aluminum alloy.

* * * * *